(12) United States Patent
Du et al.

(10) Patent No.: US 9,739,448 B2
(45) Date of Patent: *Aug. 22, 2017

(54) PATTERNED POLARIZATION GRATING POLARIZATION CONVERTER

(71) Applicant: The Hong Kong University of Science and Technology, Hong Kong (CN)

(72) Inventors: Tao Du, Hong Kong (CN); Fan Fan, Hong Kong (CN); Vladimir Grigorievich Chigrinov, Hong Kong (CN); Hoi Sing Kwok, Hong Kong (CN)

(73) Assignee: THE HONG KONG UNIVERSITY OF SCIENCE AND TECHNOLOGY, Hong Kong (CN)

( * ) Notice: Subject to any disclaimer, the term of this patent is extended or adjusted under 35 U.S.C. 154(b) by 88 days.

This patent is subject to a terminal disclaimer.

(21) Appl. No.: 14/689,666

(22) Filed: Apr. 17, 2015

(65) Prior Publication Data
US 2015/0247617 A1  Sep. 3, 2015

Related U.S. Application Data

(63) Continuation-in-part of application No. 13/888,061, filed on May 6, 2013, now Pat. No. 9,341,855.
(Continued)

(51) Int. Cl.
*F21V 9/14* (2006.01)
*F21V 13/02* (2006.01)
(Continued)

(52) U.S. Cl.
CPC ............... *F21V 9/14* (2013.01); *F21V 13/02* (2013.01); *G02B 27/283* (2013.01);
(Continued)

(58) Field of Classification Search
CPC .... G02B 3/0006; G02B 3/0037; G02B 3/005; G02B 3/0056; G02B 3/0062; G02B 5/08;
(Continued)

(56) References Cited

U.S. PATENT DOCUMENTS 3,626,511 A    12/1971  Hammer
4,468,849 A     9/1984  Anderson et al.
(Continued)

FOREIGN PATENT DOCUMENTS

WO    WO 2014/159045 A1    10/2014

OTHER PUBLICATIONS

Du et al., "Dual-domain transflective liquid crystal display using TN and L TN modes by photoalignment technology," *Society for Information Display 2009 Symposium (SID'09) Digest*, 406-409 (San Antonio, Texas, May 31-Jun. 5, 2009).
(Continued)

*Primary Examiner* — Stephone B Allen
*Assistant Examiner* — Adam W Booher
(74) *Attorney, Agent, or Firm* — Leydig, Voit & Mayer, Ltd.

(57) ABSTRACT

A liquid crystal display (LCD) backlight system includes: a light source, configured to generate light; a patterned polarization grating polarization converter (PPG-PC) assembly, configured to convert the generated light from a first polarization state to a second polarization state. The PPG-PC further includes: a patterned polarization grating (PPG) having a plurality of domains, wherein the plurality of domains of the PPG include at least two different types of domains, and wherein each domain of the PPG is configured to diffract incident light into first and second types of light beams corresponding to a first diffraction order; and a patterned retarder (PR), having a plurality of domains, the plurality of domains of the PR including domains corre-
(Continued)

sponding to areas where the first type of light beams output from the PPG and including domains corresponding to areas where the second type of light beams output from the PPG converge.

18 Claims, 11 Drawing Sheets

Related U.S. Application Data (60) Provisional application No. 61/995,658, filed on Apr. 17, 2014, provisional application No. 61/688,086, filed on May 8, 2012.

(51) Int. Cl.
  *G02B 27/28* (2006.01)
  *G02F 1/1335* (2006.01)
  *G02F 1/13363* (2006.01)
  *F21Y 115/10* (2016.01)

(52) U.S. Cl.
  CPC ....... *G02B 27/286* (2013.01); *G02F 1/13362* (2013.01); *G02F 1/13363* (2013.01); *G02F 1/133526* (2013.01); *G02F 1/133603* (2013.01); *F21Y 2115/10* (2016.08)

(58) Field of Classification Search
  CPC ...... G02B 5/18; G02B 5/1804; G02B 5/1814; G02B 5/1819; G02B 5/1833; G02B 5/1866; G02B 5/1871; G02B 5/30–5/3091; G02B 5/32; G02B 17/00; G02B 17/002; G02B 17/006; G02B 27/10; G02B 27/1086; G02B 27/28; G02B 27/42; G02B 27/44; G02B 27/286; G02B 27/283–27/285; G02B 27/4261; F21V 9/00; F21V 9/14; F21V 13/00; F21V 13/02; G02F 1/00; G02F 1/01; G02F 1/0136; G02F 1/13; G02F 1/133; G02F 1/133526; G02F 1/133528; G02F 1/133602; G02F 1/133603; G02F 1/13362; G02F 1/13363; G02F 2001/133531; G02F 2001/133541; F21Y 2115/00; F21Y 2115/10; F21Y 2115/15
  USPC ............ 359/483.01, 485.01, 485.03, 485.05, 359/485.07, 486.01, 487.01, 487.06, 359/487.07, 490.01, 492.01, 558, 566, 359/569, 571, 576, 618, 619, 626, 359/741–743; 349/96, 98; 362/19, 362/326–332
  See application file for complete search history.

(56) References Cited

U.S. PATENT DOCUMENTS

| | | | |
|---|---|---|---|
| 5,548,422 A | 8/1996 | Conner et al. | |
| 5,815,249 A | 9/1998 | Nishi et al. | |
| 5,828,471 A | 10/1998 | Davis et al. | |
| 6,177,667 B1 | 1/2001 | Fujita et al. | |
| 6,621,533 B2 | 9/2003 | Slack et al. | |
| 6,630,289 B1 | 10/2003 | Kwok et al. | |
| 6,804,039 B1 | 10/2004 | Doan et al. | |
| 7,660,226 B2 | 2/2010 | Ogata | |
| 7,692,759 B2 | 4/2010 | Escuti et al. | |
| 7,821,583 B2 | 10/2010 | Yeh et al. | |
| 2002/0167727 A1 | 11/2002 | Hansen et al. | |
| 2004/0263974 A1 | 12/2004 | McDonough et al. | |
| 2009/0122402 A1 | 5/2009 | Shemo et al. | |
| 2010/0225856 A1 | 9/2010 | Escuti et al. | |
| 2010/0225876 A1 | 9/2010 | Escuti et al. | |
| 2011/0188120 A1 | 8/2011 | Tabirian et al. | |
| 2011/0242461 A1 | 10/2011 | Escuti et al. | |
| 2011/0267483 A1 | 11/2011 | Kanamori | |
| 2012/0092668 A1 | 4/2012 | Du et al. | |
| 2013/0301126 A1 | 11/2013 | Du et al. | |

OTHER PUBLICATIONS

Du et al., "Photo patterned micro polarizer," *17th International Display Workshop* (IDW'10), 565-566 (Fukuoka, Japan, Dec. 1-3, 2010).
Guo et al., "Fabrication of thin-film micropolarizer arrays for visible imaging polarimetry," *Applied Optics*, 39 (10): 1486-1492 (Apr. 1, 2000).
Harnett et al., "Liquid-crystal micropolarizer array for polarization-difference imaging," *Applied Optics*, 41 (7): 1291-1296 (Mar. 1, 2002).
Mak et al., "Photoaligned transflective liquid crystal display using low twist nematic and electricity controlled birefringence modes," *Society for Information Display 2008 Symposium* (SID'08) Digest, 1908-1911 (Los Angeles, California, May 18-23, 2008).
Nersisyan et al., "Axial polarizers based on dichroic liquid crystals," *J. Applied Physics*, 108 (3): 033101-033101-5 (Published online Aug. 4, 2010).
Peeters et al., "High-Contrast thin-film polarizers by photo-crosslinking of smectic guest-host systems," *Advanced Materials*, 18: 2412-2417 (2006).
Stalder et al., "Linearly polarized light with axial symmetry generated by liquid-crystal polarization converters," *Optics Letters*, 21 (23): 1948-1950 (Dec. 1, 1996).
Yao et al., "Tunable photosensitivity of alignment film for flexible liquid crystal displays," *Society for Information Display 2009 Symposium* (SID'09) Digest, 1630-1633 (San Antonio, Texas, May 31-Jun. 5, 2009).
Yaroshchuk et al., "Stabilization of liquid crystal photoaligning layers by reactive mesogens," *Applied Physics Letters*, 95: 021902-1-021902-3 (2009).
Yip et al., "Photo-patterned e-wave polarizer," *Displays*, 22: 27-32 (2001).
Zhao et al., "High-resolution photoaligned liquid-crystal micropolarizer array for polarization imaging in visible spectrum," *Optics Letters*, 34 (23): 3619-3621 (Dec. 1, 2009).
Zhao et al., "Liquid-crystal micropolarimeter array for full Stokes polarization imaging in visible spectrum," *Optics Express*, 18 (17): 17776-17787 (Aug. 3, 2010).
Du et al., "Photo patterned micro polarizer and method of making the same," U.S. Appl. No. 61/344,807 (Oct. 15, 2010).
Du et al., "Polarization converter by patterned polarization grating," U.S. Appl. No. 61/,688,086 (May 8, 2012).
Suss MicroOptics SA, "Strategies for Beam Homogenizing," *Technical Information Sheet 10—Beam Homogenizing*, p. 1, http://www.suss-microoptics.com/media/downloads/SMO_TechInfo_Sheet_10.pdf, Issued Jan. 2008, Accessed Dec. 16, 2014.
Le Doucen, Myriamm, et al., "Polarization Properties and Diffraction Efficiencies of Binary Anisotropic Gratings: general study and experiments on Ferroelectric Liquid Crystals", *Optics Communications 151*, Jun. 1, 1998, p. 1, Abstract and Section 1, Introduction.
U.S. Appl. No. 13/274,127, filed Oct. 14, 2011.
U.S. Appl. No. 13/888,061, filed May 6, 2013.
U.S. Appl. No. 14/553,539, filed Nov. 25, 2014.

FIG. 13 ent layer.

PATTERNED POLARIZATION GRATING POLARIZATION CONVERTER

CROSS-REFERENCE TO RELATED APPLICATIONS

This patent application is a continuation-in-part of copending U.S. patent application Ser. No. 13/888,061, filed May 6, 2013, which claims the priority to U.S. Provisional Application No. 61/688,086, filed on May 8, 2012, which are incorporated by reference in their entireties. This patent application also claims the benefit of U.S. Provisional Patent Application No. 61/995,658, filed Apr. 17, 2014, which is incorporated by reference in its entirety.

BACKGROUND

Photoalignment technology allows for fabrication of spatially varying liquid crystal alignment patterns on a photoalignment layer. One of the types of devices that may be fabricated by utilizing such photoalignment technology is a polarization grating (PG).

A PG is a sinusoidal phase grating made of a retardation film with spatially varying optical axis. Unlike other optical gratings, a PG diffracts light into +1 and −1 diffraction orders, while all other higher orders are eliminated. Moreover, a half wave PG has the highest diffraction efficiency among all kinds of diffraction gratings.

Applications for PGs are devices based on diffraction optics. There are left hand PGs and right hand PGs, depending on the handedness of the spatially varying optical axis or axes.

In a conventional process for fabricating a PG using photoalignment, interference between two coherent laser beams having respectively left hand circular polarized light and right hand circular polarized light generates a linear polarized light pattern with spatially varying polarization directions. This linear polarized light pattern is used to expose a photoalignment layer, and thus generate spatially varying liquid crystal alignment pattern on the photoalignment layer.

SUMMARY

In an exemplary embodiment, a liquid crystal display (LCD) backlight system is provided that includes: a light source, configured to generate light; a patterned polarization grating polarization converter (PPG-PC) assembly, configured to convert the generated light from a first polarization state to a second polarization state, the PPG-PC assembly further comprising: a patterned polarization grating (PPG) having a plurality of domains, wherein the plurality of domains of the PPG include at least two different types of domains, and wherein each domain of the PPG is configured to diffract incident light into first and second types of light beams corresponding to a first diffraction order; and a patterned retarder (PR), having a plurality of domains, the plurality of domains of the PR including domains corresponding to areas where the first type of light beams output from the PPG and including domains corresponding to areas where the second type of light beams output from the PPG converge.

In another exemplary embodiment, an optical system for a liquid crystal on silicon (LCOS) device, comprising: a light source, configured to generate light; a patterned polarization grating polarization converter (PPG-PC) assembly, configured to convert the generated light from a first polarization state to a second polarization state, the PPG-PC assembly further comprising: a patterned polarization grating (PPG) having a plurality of domains, wherein the plurality of domains of the PPG include at least two different types of domains, and wherein each domain of the PPG is configured to diffract incident light into first and second types of light beams corresponding to a first diffraction order; a patterned retarder (PR), having a plurality of domains, the plurality of domains of the PR including domains corresponding to areas where the first type of light beams output from the PPG and including domains corresponding to areas where the second type of light beams output from the PPG converge; a first lens array, disposed proximate to the PPG; and a second lens array, disposed proximate to the PR; and a condenser lens, configured to collect light output from the PR and project the collected light onto a display plane.

BRIEF DESCRIPTION OF THE SEVERAL VIEWS OF THE DRAWINGS

Exemplary embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the invention provides a polarization converter capable of converting input light of any polarization state (including light in a non-polarized state) to output linear or circular polarized light with very high efficiency and wide acceptance angle. This embodiment provides increased optical efficiency for polarized optical systems, and has application, for example, in Liquid Crystal On Silicon (LCOS) and Liquid Crystal Display (LCD) devices. Additional advantages include significant reductions in power consumption for such LCOS and LCD devices, which allows for increased battery life—which is particularly advantageous for mobile and portable devices having a display.

Although conventional polarization converters and polarizers that convert input light with a specified polarization state to output light with another specified polarization state exist, the conversion efficiency of such devices is usually highly dependent on the polarization state of the input light. This means that, if the input light is non-polarized, the conversion efficiency of conventional polarization converters and polarizers will decrease significantly. In contrast, in an embodiment of the invention, which utilizes a patterned polarization grating, the polarization converter converts input light with any polarization state to output light with a specified polarization state with efficiency close to 100%. Moreover, the polarization converter according to this embodiment is usable to convert a non-polarized light source to a polarized light source with very high efficiency (much higher relative to the efficiency of conventional absorptive and reflective polarizers).

Figure 1A:
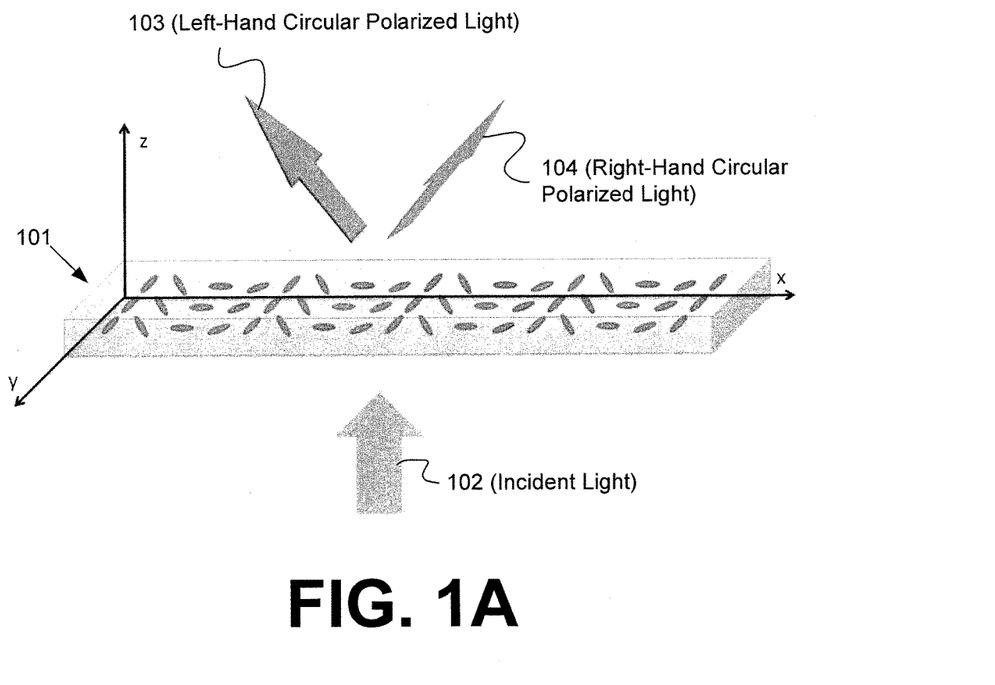
FIG. 1A is a schematic diagram illustrating non-polarized light incident on a polarization grating with one domain.

FIG. 1A is a schematic diagram illustrating light incident on a polarization grating 101 with one domain. As can be seen in FIG. 1A, inputting non-polarized light 102 into the polarization grating 101 outputs left hand circular polarized light 103 and right hand circular polarized light 104 propagating in directions corresponding to the +1 and −1 diffraction order. With normal incident light, the angle of the $1^{st}$ order diffraction beam relative to the normal direction of the grating is defined by the equation:

$$1^{st} \text{ order diffraction angle} = \text{Arcsine}(\lambda/\Lambda),$$

where $\lambda$ is the wavelength of the incident light, and $\Lambda$ is the grating pitch. Thus, the smaller the grating pitch, the larger the $1^{st}$ order diffraction angle will be. Further, because the polarization grating provides only the +1 and −1 diffraction order, the diffraction efficiency provided by the polarization grating is close to 100%.

Figure 1B:
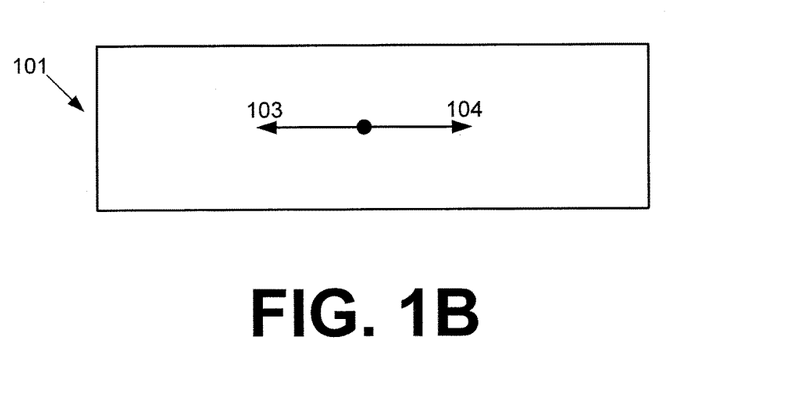
FIG. 1B is a schematic diagram illustrating a top-down view of the polarization grating from FIG. 1A showing the orientation of the domain.

FIG. 1B illustrates a top-down view of the polarization grating from FIG. 1A showing the orientation of the light output by the domain.

Figure 2A:
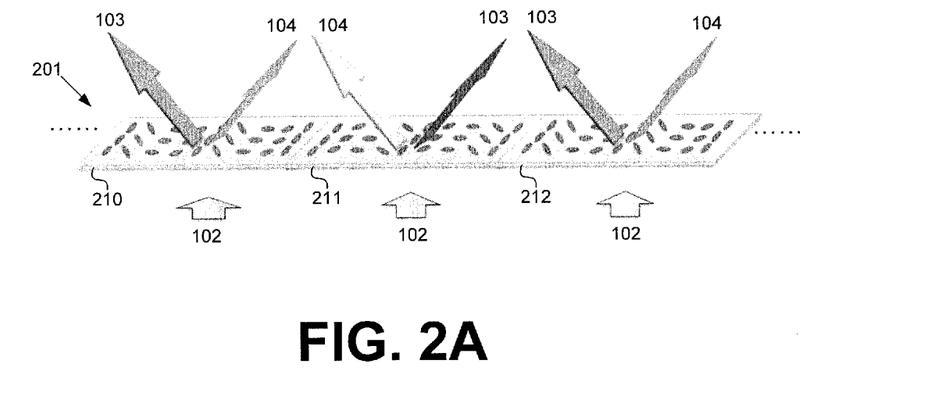
FIG. 2A is a schematic diagram illustrating non-polarized light incident on a patterned polarization grating that is one-dimensionally patterned with both left hand and right hand polarization grating domains.

Using photoalignment technology, a polarization grating can be patterned with multiple domains having different grating structure or different grating vector orientation, for example, as illustrated in FIG. 2A. FIG. 2A is a schematic diagram illustrating light incident on a patterned polarization grating 201 that is one-dimensionally patterned with both left hand polarization grating domains (e.g., 210, 212) and right hand polarization grating domains (e.g., 211). Although only three exemplary domains are depicted in FIG. 2A, it will be appreciated that the exemplary patterned polarization grating 201 may include further domains extending to the left and to the right of the three exemplary domains depicted in FIG. 2A.

Because left hand and right hand polarization grating domains are disposed next to one another, adjacent diffraction beams coming out of the patterned polarization grating 201 have the same circular polarization state (e.g., the beams 104 from domains 210 and 211, and the beams 103 from the domains 211 and 212).

The patterned polarization grating 201 may, for example, be a broadband patterned polarization grating which has high diffraction efficiency across a wide wavelength band.

Figure 2B:
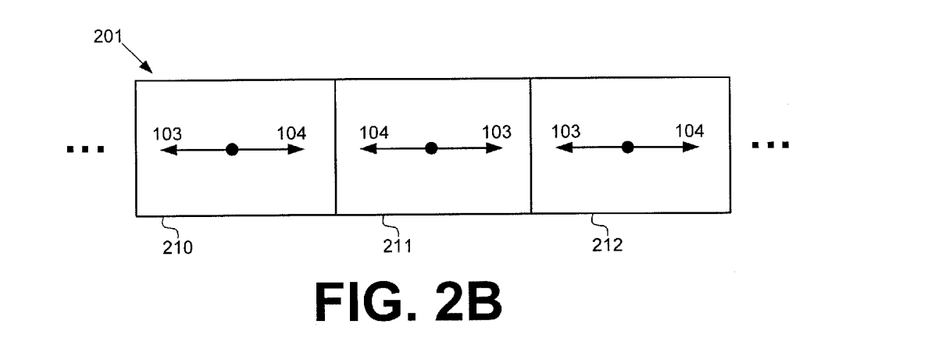
FIG. 2B is a schematic diagram illustrating a top-down view of the patterned polarization grating from FIG. 2A showing the orientations of the left hand and right hand polarization grating domains.

FIG. 2B illustrates a top-down view of the patterned polarization grating 201 from FIG. 2A showing the orientations of the light (left-hand circular polarized light 103 and right-hand circular polarized light 104) output by each of the domains 210, 211, 212.

Figure 3A:
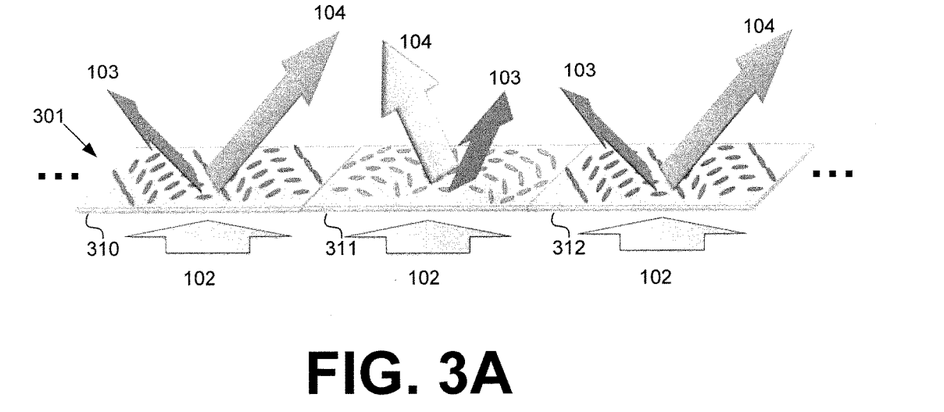
FIG. 3A is a schematic diagram illustrating non-polarized light incident on a patterned polarization grating that is one-dimensionally patterned with two types of polarization grating domains.

In the exemplary embodiment of the patterned polarization grating 201 illustrated in FIGS. 2A and 2B, adjacent domains have relative orientations of 180 degrees. In other exemplary embodiments, adjacent domains have different relative orientations. For example, FIG. 3A is a schematic diagram illustrating non-polarized light 102 incident on a patterned polarization grating 301 with adjacent domains having relative orientations of 90 degrees (between domains 310 and 311) and 270 degrees (between domains 311 and 312). Thus, FIG. 3A illustrates two exemplary types of domains disposed adjacent to one another that, similar to the example of FIG. 2A, may form a repeating pattern.

Figure 3B:
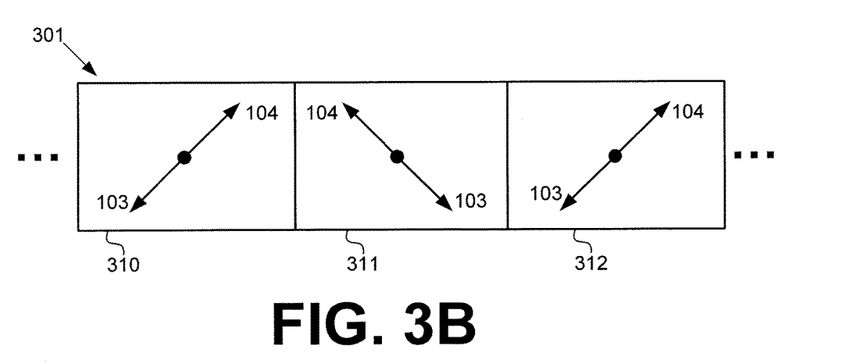
FIG. 3B is a schematic diagram illustrating a top-down view of the patterned polarization grating from FIG. 3A showing the orientations of the polarization grating domains.

FIG. 3B illustrates a top-down view of the patterned polarization grating 301 from FIG. 3A showing the orientations of the light (left-hand circular polarized light 103 and right-hand circular polarized light 104) output by each of the domains 310, 311, 312.

Figure 4A:
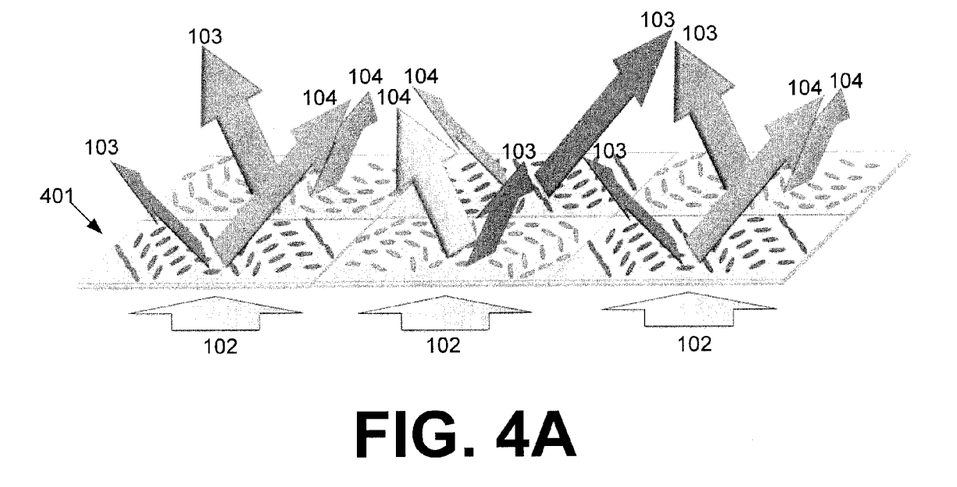
FIG. 4A is a schematic diagram illustrating non-polarized light incident on a patterned polarization grating that is two-dimensionally patterned with four types of polarization grating domains.

FIG. 4A is a schematic diagram illustrating non-polarized light 102 incident on a patterned polarization grating 401 with adjacent domains having relative orientations of 90 degrees (e.g., +90 degrees or −90 degrees relative to one another). Further, FIG. 4A illustrates a two-dimensional configuration having four different types of polarization grating domains, with 2×2 groups of four domains configured such that circular polarized light of a particular type (left-hand circular polarized light 103 or right-hand circular polarized light 104) converges at the center of the 2×2 groups of four domains. It will be appreciated that, in other exemplary embodiments, adjacent domains may have other non-90 degree relative orientations.

Figure 4B:
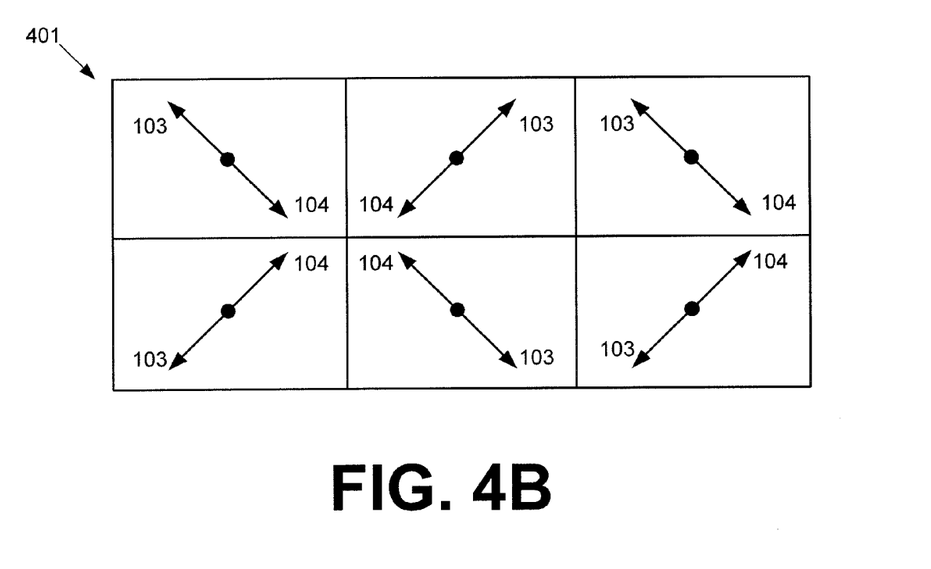
FIG. 4B is a schematic diagram illustrating a top-down view of the patterned polarization grating from FIG. 4A showing the orientations of the polarization grating domains.

FIG. 4B illustrates a top-down view of the patterned polarization grating 401 from FIG. 4A showing the orientations of the light (left-hand circular polarized light 103 and right-hand circular polarized light 104) output by each of the domains.

It will be appreciated that, although FIGS. 2A, 3A and 4A illustrate patterned polarization gratings with uniformly distributed polarization grating domains, polarization grating domains that are not uniformly distributed may also be utilized with respect to other exemplary embodiments.

Figure 5:
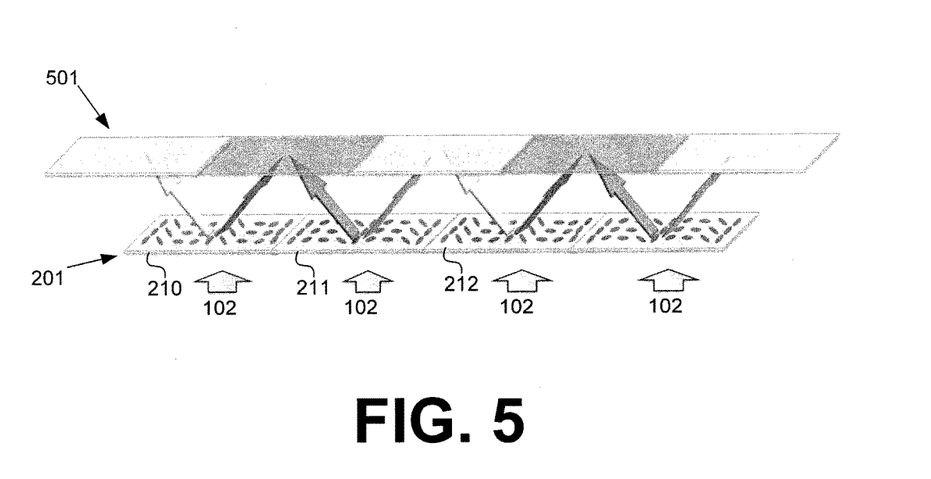
FIG. 5 is a schematic diagram illustrating light incident on the patterned polarization grating depicted in FIGS. 2A and 2B, with a patterned retarder having multiple domains corresponding to regions of the circular polarized light output from the patterned polarization grating.
Figure 6:
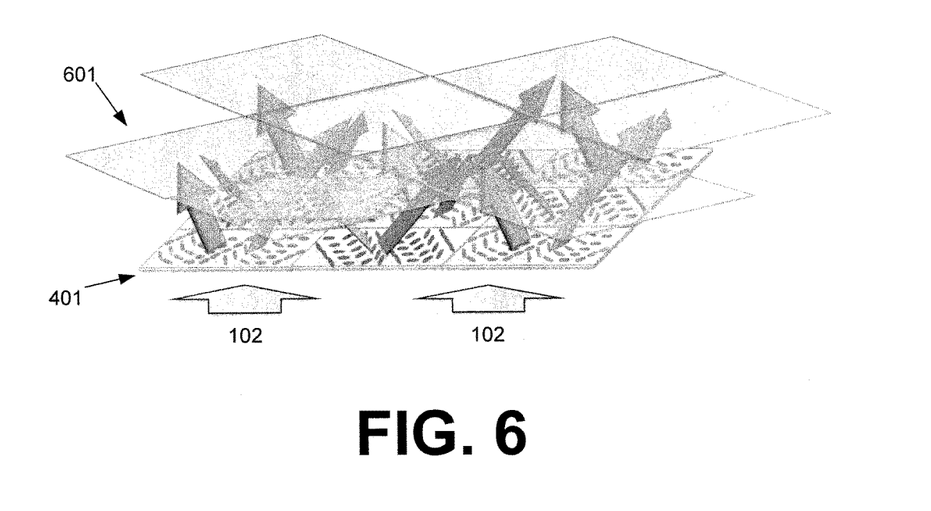
FIG. 6 is a schematic diagram illustrating light incident on the patterned polarization grating depicted in FIGS. 4A and 4B, with a patterned retarder having multiple domains corresponding to regions of the circular polarized light output from the patterned polarization grating.

FIGS. 5 and 6 are schematic diagrams illustrating light 102 incident on the patterned polarization gratings 201, 401 shown in FIGS. 2A and 4A, respectively, further with a corresponding patterned retarder 501, 601 having multiple domains disposed at a certain distance from the patterned polarization grating 201, 401. The distance at which the patterned retarder 501, 601 is positioned relative to the patterned polarization grating 201, 401 is based on the grating pitch and the size of the patterned grating domains, and the domains of the patterned retarder 501, 601 correspond to areas where the left hand circular beams and the right hand circular beams generated by the patterned polarization grating 201, 401 are separate from each other.

The patterned retarder 501, 601 thus converts the left hand and right hand circular polarized beams into uniform linear polarized or uniform circular polarized light based on the type/configuration of the domains of the patterned retarder 501, 601. The patterned retarder 501, 601 may be, for example, a quarter wave plate or a patterned half wave plate so as to provide output linear polarized light or output circular polarized light at a desired orientation. The patterned retarder 501, 601 may also utilize other types of non-uniform patterned retardation films (e.g., other than quarter wave and half wave), to allow for light to be outputted from the patterned retarder with other polarization states (e.g., other than linear and circular).

In an exemplary embodiment, the patterned retarder may include quarter wave plate domains at different orientations, such that different orientations of circular polarized light being input into the patterned retarder are all converted to linear polarized light having the same direction. In another exemplary embodiment, the patterned retarder may include half wave plate domains and non-retardation domains, such that left-hand and right-hand circular polarized beams input into the patterned retarder are converted to (or stay the same) circular polarized light beams all having one circular polarized orientation.

The patterned retarder 501, 601 may, for example, be a broadband patterned retarder which has the desired retardation effect across a wide wavelength band.

Figure 7:
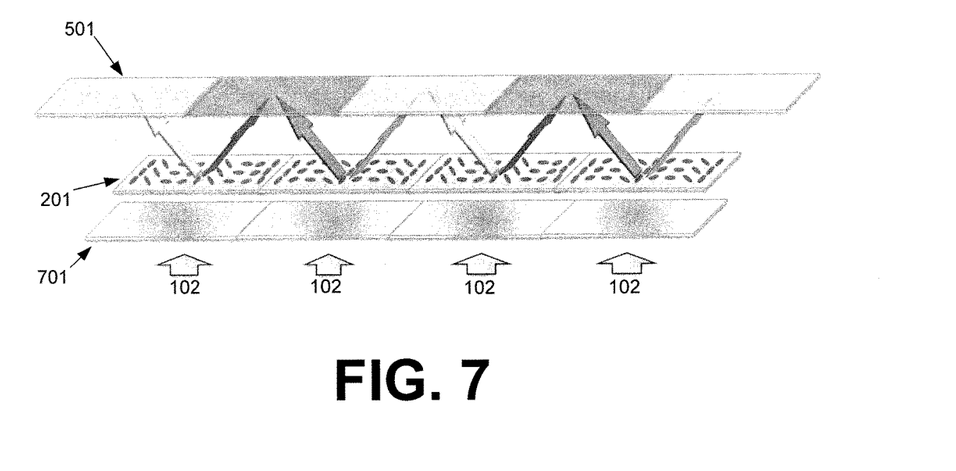
FIG. 7 is a schematic diagram illustrating light incident on the assembly depicted in FIG. 5, with a lens array to focus incident light entering the patterned polarization grating.
Figure 8:
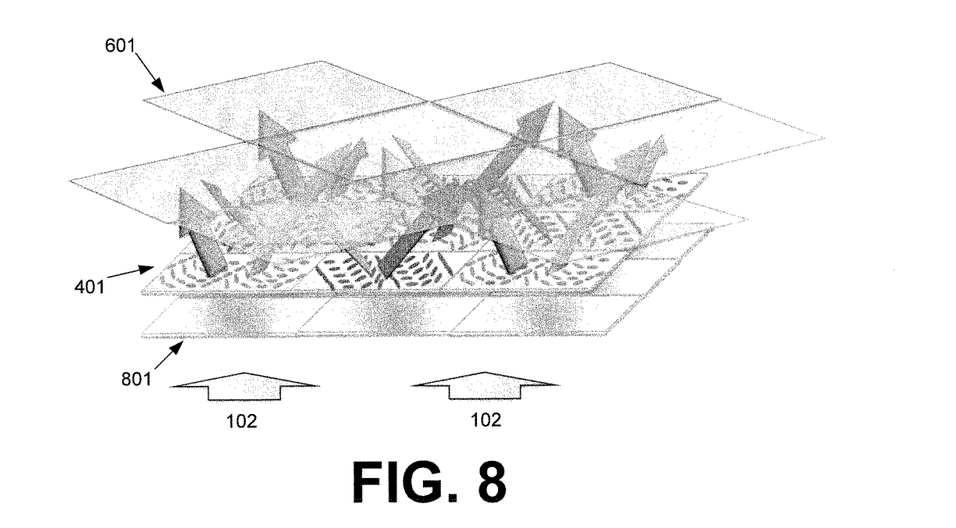
FIG. 8 is a schematic diagram illustrating light incident on the assembly depicted in FIG. 6, with a lens array to focus incident light entering the patterned polarization grating.

FIGS. 7 and 8 are schematic diagrams illustrating light 102 incident on the patterned polarization gratings 201, 401 with patterned retarders 501, 601 shown in FIGS. 5 and 6, respectively, further with a lens array 701, 801 configured to focus incident light entering the patterned polarization grating 201, 401. The lens array 701, 801 is provided because, when the incident light 102 has a divergence angle, it may be difficult to separate the left hand and right hand circular beams generated by the patterned polarization grating at any distance from the patterned polarization grating. The lens array 701, 801 addresses this issue by reducing or eliminating the divergence angle of the incident light 102 before it reaches the patterned polarization grating 201, 401, to ensure that the incident light 102 is relatively more (or completely) normal to the patterned polarization grating 201, 401. As shown in the exemplary embodiments of FIGS. 7 and 8, the lens array 701, 801 may comprise a plurality of lenses (or "lenslets"), with a separate lens being provided for each domain of the patterned polarization grating and in alignment with such patterned polarization grating 201, 401. It will be appreciated that this, however, is not a requirement. It will further be appreciated that, for example, the lenses or lenslets of the lens array may be cylindrical lenses, and that the lens array may be made of glass material or be made of plastic material.

Figure 9:
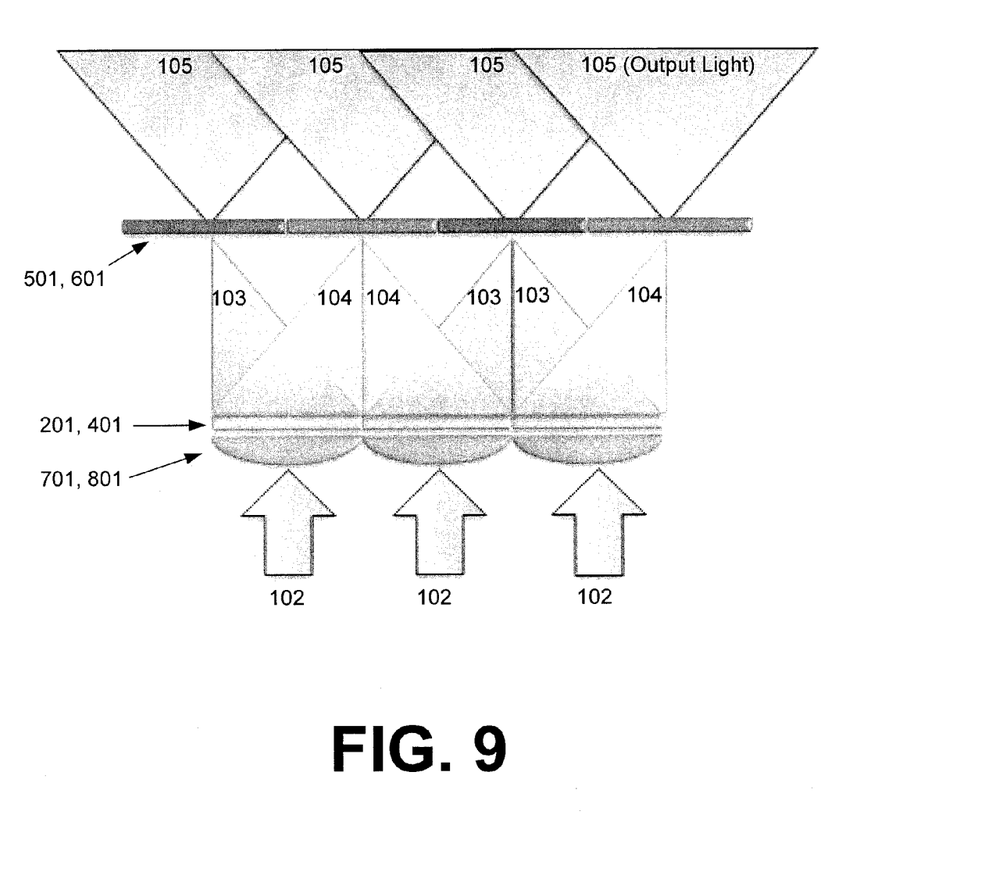
FIG. 9 is a schematic diagram illustrating light incident on a patterned polarization grating polarization converter (PPG-PC) device having a lens array, a patterned polarization grating, and a patterned retarder.

FIG. 9 is a schematic diagram illustrating light 102 incident on a patterned polarization grating polarization converter (PPG-PC) device having a lens array 701, 801 (e.g., a fly eye lens array, and/or in accordance with the discussed above with respect to FIGS. 7 and 8), a patterned polarization grating 201, 401 (e.g., as discussed above with respect to 2A and 4A), and a patterned retarder 501, 601 (e.g., as discussed above with respect to FIGS. 5 and 6). In the exemplary embodiment depicted n FIG. 9, the positions of the lenses of the lens array 701, 801 is in alignment with the positions of the domains in the patterned polarization grating 201, 401, and the positions of the domains in the patterned polarization grating correspond to the positions of the domains in the patterned retarder 501, 601 with a half pitch shift.

In a one-dimensional implementation (e.g., as depicted in FIG. 2A), the half pitch shift is applied with respect to one direction, while in a two-dimensional implementation (e.g., as depicted in FIG. 4A), the half pitch shift is applied with respect to two directions (e.g., both x- and y- directions). As discussed above with respect to FIGS. 5 and 6, the patterned retarder 501, 601 may be a patterned quarter wave plate (so that the PPG-PC converts input non-polarized light to output linear polarized light), a patterned half wave plate (so that the PPG-PC converts input non-polarized light to output circular polarized light), or some other type of non-uniform patterned retardation film (so that the PPG-PC converts input non-polarized light to output light with some other desired polarization state).

Further, as illustrated in FIG. 9, even if the incident light 102 is collimated, the output light 105 from the PPG-PC diverges at a certain divergence angle, and the output light 105 from adjacent domains of the patterned retarder 501, 601 will end up being mixed after a short distance from the PPG-PC. This is particularly advantageous for LCD backlight applications, as the effects of mixing the diverging beams of light 105 allows for the uniformity of the intensity of the output to be increased.

It will be appreciated that the PPG-PC illustrated in FIG. 9 provides for polarization conversion at or close to 100% efficiency. It will further be appreciated that the PPG-PC provides functionality that is similar to the functionality of a conventional diffuser in an LCD backlighting system, and the PPG-PC is usable to replace such diffusers.

Figure 10:
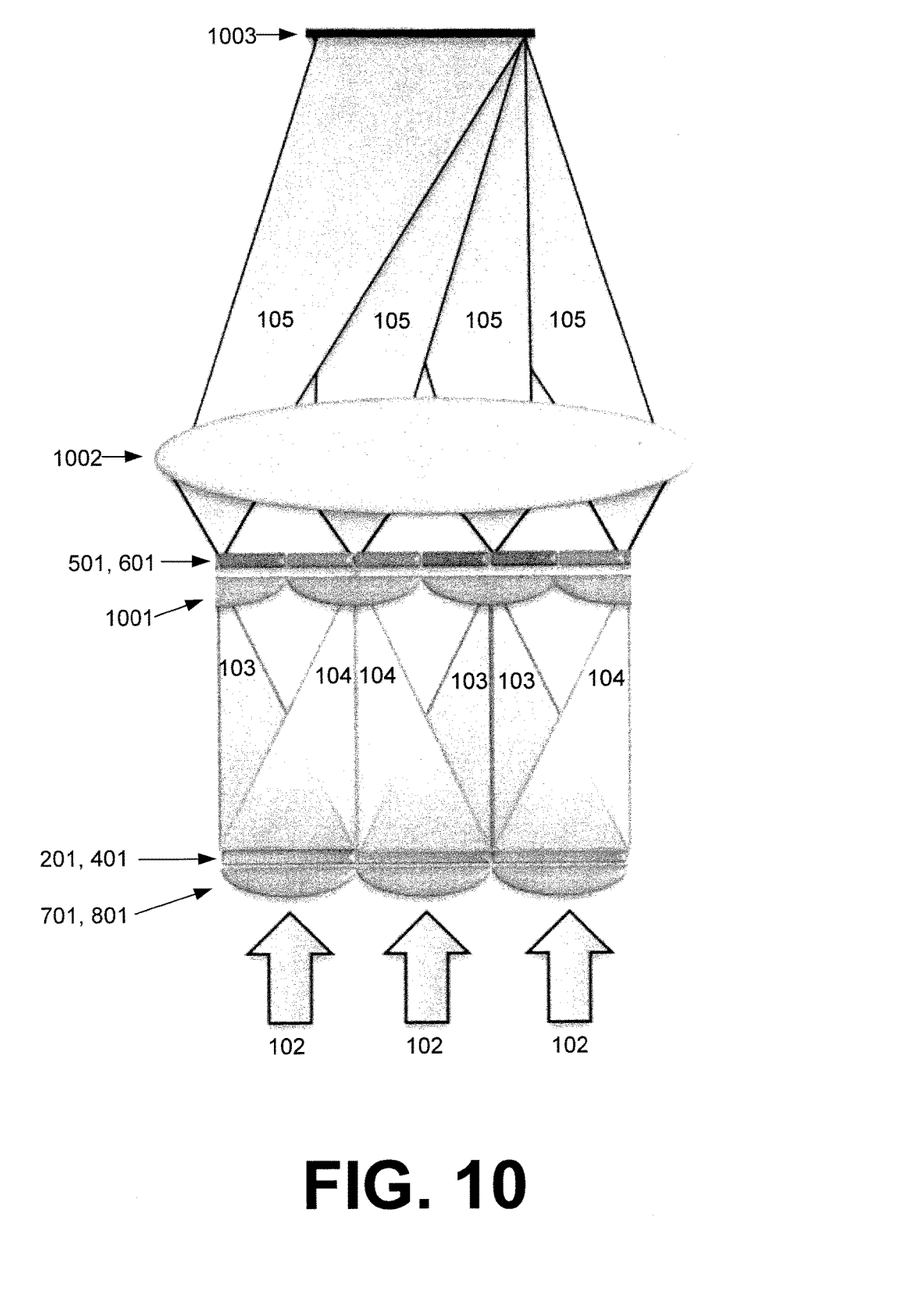
FIG. 10 is a schematic diagram illustrating light incident on the PPG-PC depicted in FIG. 9, further with a second lens array disposed proximate to the patterned retarder between the patterned retarder and the patterned polarization grating and a condenser lens disposed after the patterned retarder.

FIG. 10 is a schematic diagram illustrating light incident on the PPG-PC depicted in FIG. 9, further with a second lens array 1001 (e.g., a second fly-eye lens array) disposed proximate to the patterned retarder 501, 601 between the patterned retarder 501, 601 and the patterned polarization grating 201, 401 and a condenser lens 1002 disposed after the patterned retarder 501, 601. The second lens array 1001 and the condenser 1002 lens are operative to facilitate provision of light at a uniform exposure level on a display panel 1003 (e.g., a LCOS panel) for linear polarized light 105 provided by the PPG-PC. For example, for an exemplary LCOS pico projector, without the second lens array 1001, the system would only work for collimated normal incidence, while with the second lens array 1001, the system has a certain tolerance to incident angles and divergence. The condenser lens 1002 collects the output light from the system and projects it on a display plane (i.e., onto an LCOS panel), so as to provide high uniformity for the output.

It will be appreciated that the first lens array 701, 801, may be positioned in front of PPG or right behind the PPG, and that the second lens array 1001 may be positioned right in front of the PR or right behind the PR. It will further be appreciated that the second lens array 1001 is configured to provide a certain tolerance to the incident light divergence, and, for example, may be a fly-eye lens array system.

Figure 11:
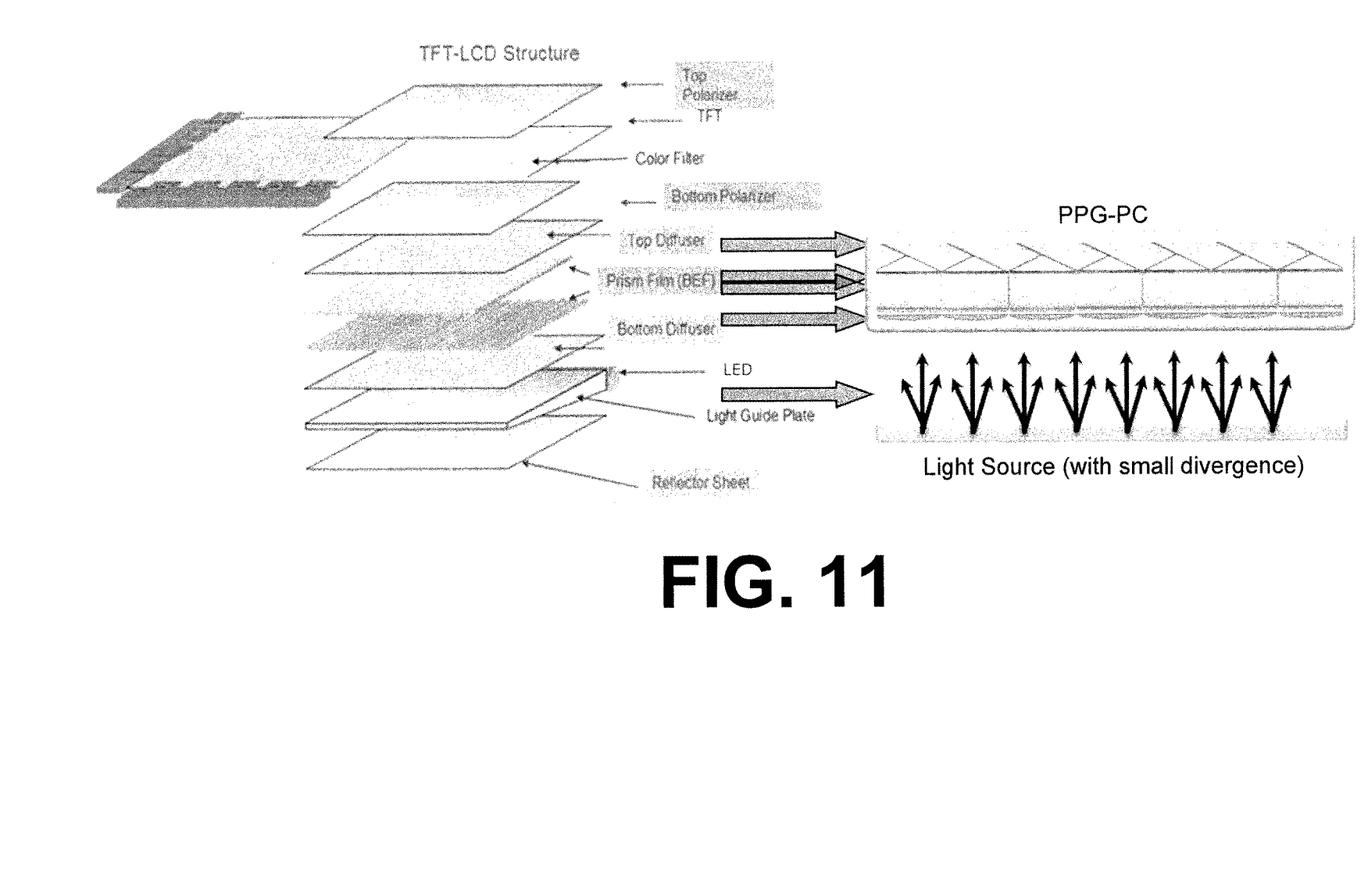
FIG. 11 is a schematic diagram illustrating the incorporation of a PPG-PC device into a thin film transistor (TFT) liquid crystal display (LCD) environment.
Figure 12:
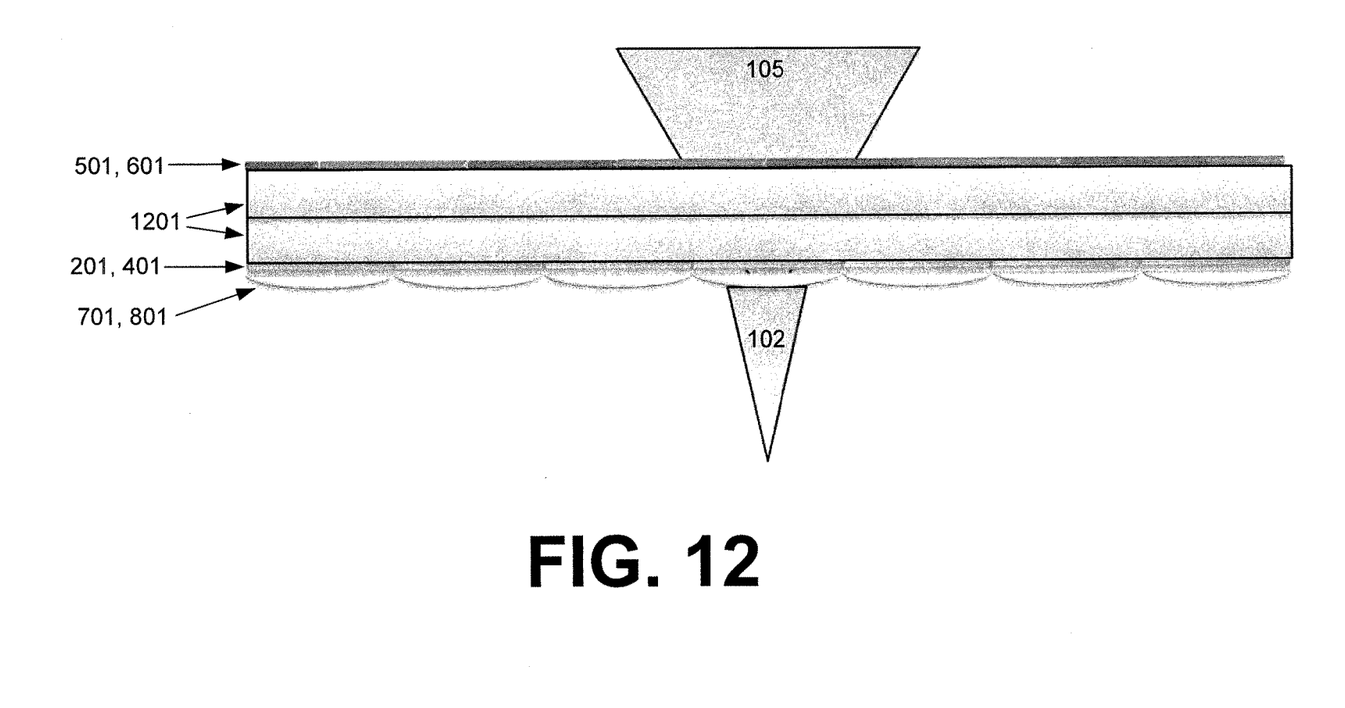
FIG. 12 illustrates an exemplary thin-film patterned polarization grating polarization converter structure usable in the environment depicted in FIG. 11.

FIG. 11 is a schematic diagram illustrating the inclusion of a PPG-PC device into a general thin film transistor (TFT) liquid crystal display (LCD) environment. On the left-hand side of FIG. 11 is an exemplary TFT-LCD structure including a reflector sheet layer, a light guide plate with LEDs, a bottom diffuser layer, a prism film layer, a top diffuser layer, a bottom polarizer layer, a color filter layer, a liquid crystal panel with TFT layer, and a top polarizer layer. The light guide plate with LEDs layer corresponds to a source of incident light (e.g., with some divergence as shown in FIG. 11). The conventional optical films in LCD backlight systems having the top diffuser, prism film layers, and bottom diffuser layer is replaced with an embodiment of PPG-PC (e.g., according to the exemplary embodiments discussed herein) to provide conversion of input non-polarized light from the light source to output linear polarized light while at the same time providing divergent light beams from adjacent domains that are mixed to produce uniform exposure for the LCD panel. It will be appreciated that additional color enhancing layers and/or a wavelength shifting layer can be added to this structure as well (e.g., additional photo-luminance layers). FIG. 12 illustrates an exemplary thin-film PPG-PC structure, including, for example, lens array 701, 801, patterned polarization grating 201, 401, substrates 1201, and patterned retarder 501, 601, usable in the environment depicted in FIG. 11.

In the exemplary implementation depicted in FIG. 12, the PPG-PC converts non-polarized input light to output light with a desired linear polarization state, and a conversion efficiency of over 90% is achievable using an achromatic patterned polarization grating and an achromatic patterned retarder. At the same time, the use of the light source having a small divergence angle and the light guide will also facilitate better light extraction efficiency due to the relatively short light path within the light guide and smaller leakage. In an example, embodiments of the invention were able to achieve around three times the optical efficiency relative to a conventional LCD structure.

Figure 13:
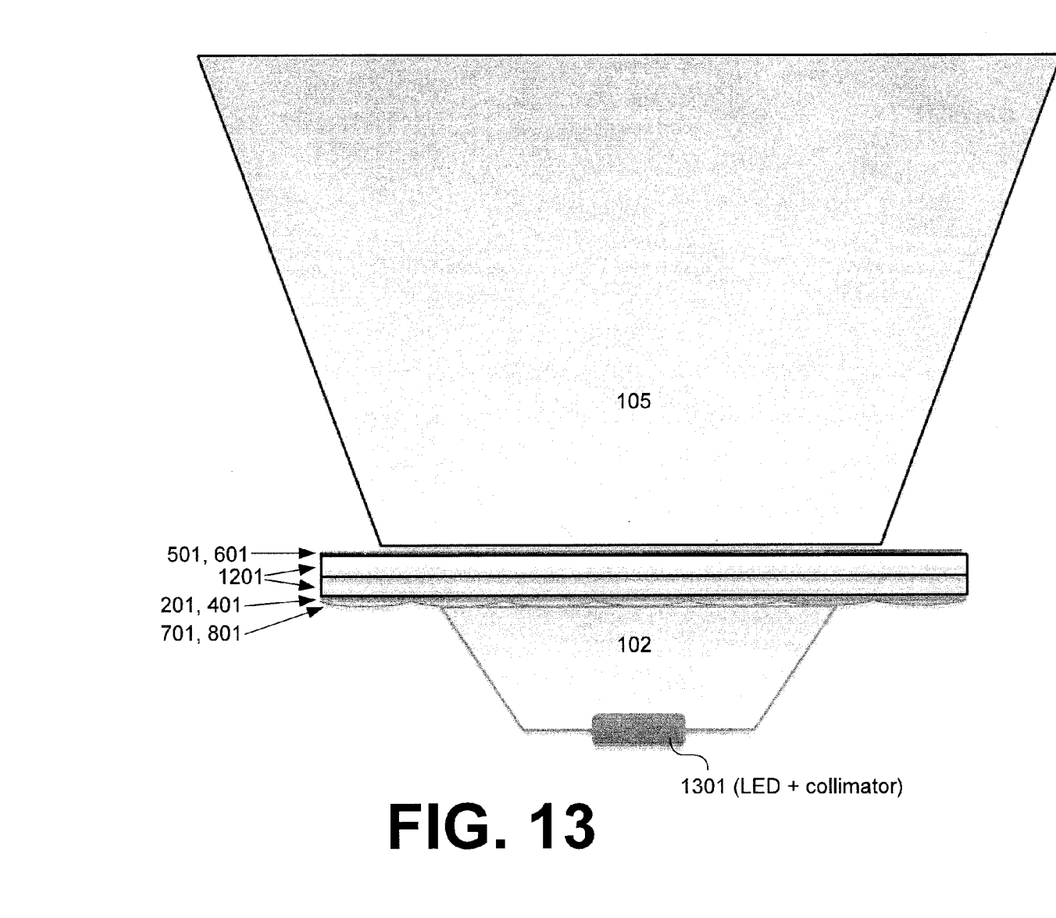
FIG. 13 illustrates an exemplary thin-film patterned polarization grating polarization converter structure usable in an environment having a LED light source.

FIG. 13 illustrates another exemplary environment in which embodiments of the invention may be used. In lighting applications, and particularly in LCD backlight applications, having a light-emitting diode (LED) light source, the LED source can be used together with a collimator to provide a LED light source 1301. The LED light source 1301, together with the exemplary embodiments of the PPG-PC discussed above, provide a polarized LED light source that is useful in LED LCD backlighting systems, and are able to provide efficient polarization conversion in such environments as well.

Further, although not depicted in FIG. 13, the light provided by the polarized LED light source 1301 may pass through a light guide of a LED LCD backlighting system before reaching the PPG-PC.

Thus, in one example, to provide a polarized LED light source, a PPG-PC assembly is positioned directly in front of LEDs (or in front of the LEDs with a collimator), so as to achieve a desired polarization state for the light output from the LEDs and passing through the PPG-PC. In an alternate example, the PPG-PC is remote relative to the LEDs (or LEDs with collimator), and the light guide directs light output from the LEDs (or LEDs with collimator) to the PPG-PC for the desired polarization state conversion.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A liquid crystal display (LCD) backlight system, comprising:
   a light source, configured to generate light;
   a patterned polarization grating polarization converter (PPG-PC) assembly, configured to convert the generated light from a first polarization state to a second polarization state, the PPG-PC assembly further comprising:

a patterned polarization grating (PPG) having a plurality of domains, wherein the plurality of domains of the PPG include at least two different types of domains each having a different grating vector orientation, and wherein each domain of the PPG is configured to diffract incident light into left hand circular polarized light beams and right hand circular polarized light beams corresponding to a first diffraction order; and a patterned retarder (PR), having a plurality of domains, the plurality of domains of the PR including domains corresponding to areas where the left hand circular polarized light beams output from the PPG converge and including domains corresponding to areas where the right hand circular polarized light beams output from the PPG converge.

2. The LCD backlight system according to claim 1, wherein the at least two different types of domains of the PPG include a first type of domain of the PPG and a second type of domain of the PPG, wherein the first type of domain of the PPG has an orientation that is at a 180° relative rotation relative to the second type of domain of the PPG.

3. The LCD backlight system according to claim 1, wherein the at least two different types of domains of the PPG include a first type of domain of the PPG and a second type of domain of the PPG, wherein the first type of domain of the PPG has an orientation that is at a non-180° relative rotation relative to the second type of domain of the PPG.

4. The LCD backlight system according to claim 1, wherein the at least two different types of domains of the PPG include a first type of domain of the PPG, a second type of domain of the PPG, a third type of domain of the PPG, and a fourth type of domain of the PPG.

5. The LCD backlight system according to claim 4, wherein the plurality of domains of the PPG are configured such that different types of domains are adjacent to one another.

6. The LCD backlight system according to claim 5, wherein adjacent domains of the plurality of domains of the PPG have orientations that are at a 90° relative rotation relative to one another.

7. The LCD backlight system according to claim 5, wherein adjacent domains of the plurality of domains of the PPG have orientations that are at a non-90° relative rotation relative to one another.

8. The LCD backlight system according to claim 1, wherein the light source comprises light-emitting diodes (LEDs).

9. The LCD backlight system according to claim 8, wherein the light source further comprises a collimator.

10. The LCD backlight system according to claim 9, further comprising a light guide.

11. The LCD backlight system according to claim 1, wherein the PPG-PC assembly further comprises a lens array, disposed such that the light from the light source is configured to pass through the lens array before the PPG.

12. The LCD backlight system according to claim 11, wherein the lens array comprises a plurality of lenslets.

13. The LCD backlight system according to claim 12, wherein the plurality of lenslets are cylindrical lenslets.

14. The LCD backlight system according to claim 1, wherein the PPG is a broadband PPG.

15. The LCD backlight system according to claim 1, wherein the PR comprises patterned quarter wave plate domains;

wherein the domains of the PR corresponding to areas where the left hand circular polarized light beams output from the PPG converge are configured to convert the left hand circular polarized light beams output from the PPG to linear polarized light and the domains of the PR corresponding to areas where the right hand circular polarized light beams output from the PPG converge are configured to convert the right hand circular polarized light beams output from the PPG to linear polarized light; and wherein the linear polarized light output from the domains of the PR corresponding to areas where the left hand circular polarized light beams output from the PPG converge and the linear polarized light output from the domains of the PR corresponding to areas where the right hand circular polarized light beams output from the PPG converge have the same linear polarization direction.

16. The LCD backlight system according to claim 1, wherein the PR comprises patterned half wave plate domains and zero retardation domains;

wherein the domains of the PR corresponding to areas where the left hand circular polarized light beams output from the PPG converge are configured to convert the left hand circular polarized light beams output from the PPG to right hand circular polarized light and the domains of the PR corresponding to areas where the right hand circular polarized light beams output from the PPG converge are configured to allow the right hand circular polarized light beams output from the PPG to pass through without retardation; or wherein the domains of the PR corresponding to areas where the right hand circular polarized light beams output from the PPG converge are configured to convert the right hand circular polarized light beams output from the PPG to left hand circular polarized light and the domains of the PR corresponding to areas where the left hand circular polarized light beams output from the PPG converge are configured to allow the left hand circular polarized light beams output from the PPG to pass through without retardation.

17. The LCD backlight system according to claim 1, wherein the PR is a broadband PR.

18. An optical system for a liquid crystal on silicon (LCOS) device, comprising:

a light source, configured to generate light;

a patterned polarization grating polarization converter (PPG-PC) assembly, configured to convert the generated light from a first polarization state to a second polarization state, the PPG-PC assembly further comprising:

a patterned polarization grating (PPG) having a plurality of domains, wherein the plurality of domains of the PPG include at least two different types of domains each having a different grating vector orientation, and wherein each domain of the PPG is configured to diffract incident light into left hand circular polarized light beams and right hand circular polarized light beams corresponding to a first diffraction order;

a patterned retarder (PR), having a plurality of domains, the plurality of domains of the PR including domains corresponding to areas where the left hand circular polarized light beams output from the PPG converge and including domains corresponding to areas where the right hand circular polarized light beams output from the PPG converge;

a first lens array, disposed proximate to the PPG; and a second lens array, disposed proximate to the PR; and a condenser lens, configured to collect light output from the PR and project the collected light onto a display plane.

\* \* \* \* \*